United States Patent [19]

Shelton

[11] Patent Number: 4,507,073

[45] Date of Patent: Mar. 26, 1985

[54] WEB MANUFACTURING APPARATUS

[75] Inventor: John J. Shelton, Tuttle, Okla.

[73] Assignee: Fife Corporation, Oklahoma City, Okla.

[21] Appl. No.: 580,345

[22] Filed: Feb. 15, 1984

[51] Int. Cl.³ .............................. B29C 1/00; B29F 3/04
[52] U.S. Cl. ..................................... 425/466; 101/169; 101/365; 118/667; 219/512; 411/378; 425/141; 425/143; 425/376 R
[58] Field of Search ................. 118/666, 667; 425/141, 425/145, 192 R, 376 A, 376 R, 381, 461, 466, 143, 378 R; 101/169, 365; 411/383, 378; 219/512, 515, 201, 216, 490

[56] References Cited

U.S. PATENT DOCUMENTS

| | | | |
|---|---|---|---|
| 2,938,231 | 5/1960 | Lowey, Jr. ........................ | 425/466 |
| 3,132,377 | 5/1964 | Allenbaugh et al. ............. | 425/466 |
| 3,142,090 | 7/1964 | Hoffman et al. ................. | 425/466 |
| 3,694,119 | 9/1972 | Scheibling ....................... | 425/131 |
| 3,888,173 | 6/1975 | Ritzerfeld ........................ | 118/167 |
| 3,940,221 | 2/1976 | Nissel .............................. | 425/141 |
| 3,985,845 | 10/1976 | Akatsuka et al. ............... | 425/141 |
| 4,024,834 | 5/1977 | Carter ............................. | 118/667 |
| 4,302,172 | 11/1981 | Hogseth et al. .................. | 425/141 |

OTHER PUBLICATIONS

Two Pages of Sales Literature, Extrusion Dies Incorporated.
Three Pages of Sales Literature, Measurex Corporation.

Primary Examiner—Willard E. Hoag
Attorney, Agent, or Firm—Dunlap & Codding

[57] ABSTRACT

A web manufacturing apparatus including a flexible shaping member that engages fluid material of which a web is formed, a support that extends parallel to the shaping member and a plurality of thermal expansion rods that extend between the shaping member and the support so that the shaping member can be flexed to control the web thickness profile by means of heaters on the thermal expansion rod. Each thermal expansion rod is fixed to the shaping member and is secured to the support via a differential screw mechanism that includes a driven screw and an adjusting screw positioned in tandem in a threaded bore through the support and are coupled so that the driven screw can be turned by turning the adjusting screw. The driven and adjusting screws have internally threaded bores and one end of the thermal expansion rod screws into the bore of the driven screw. A jam screw is screwed into the bore of the adjusting screw to be screwed down against the end of the thermal expansion rod within the differential screw mechanism.

18 Claims, 5 Drawing Figures

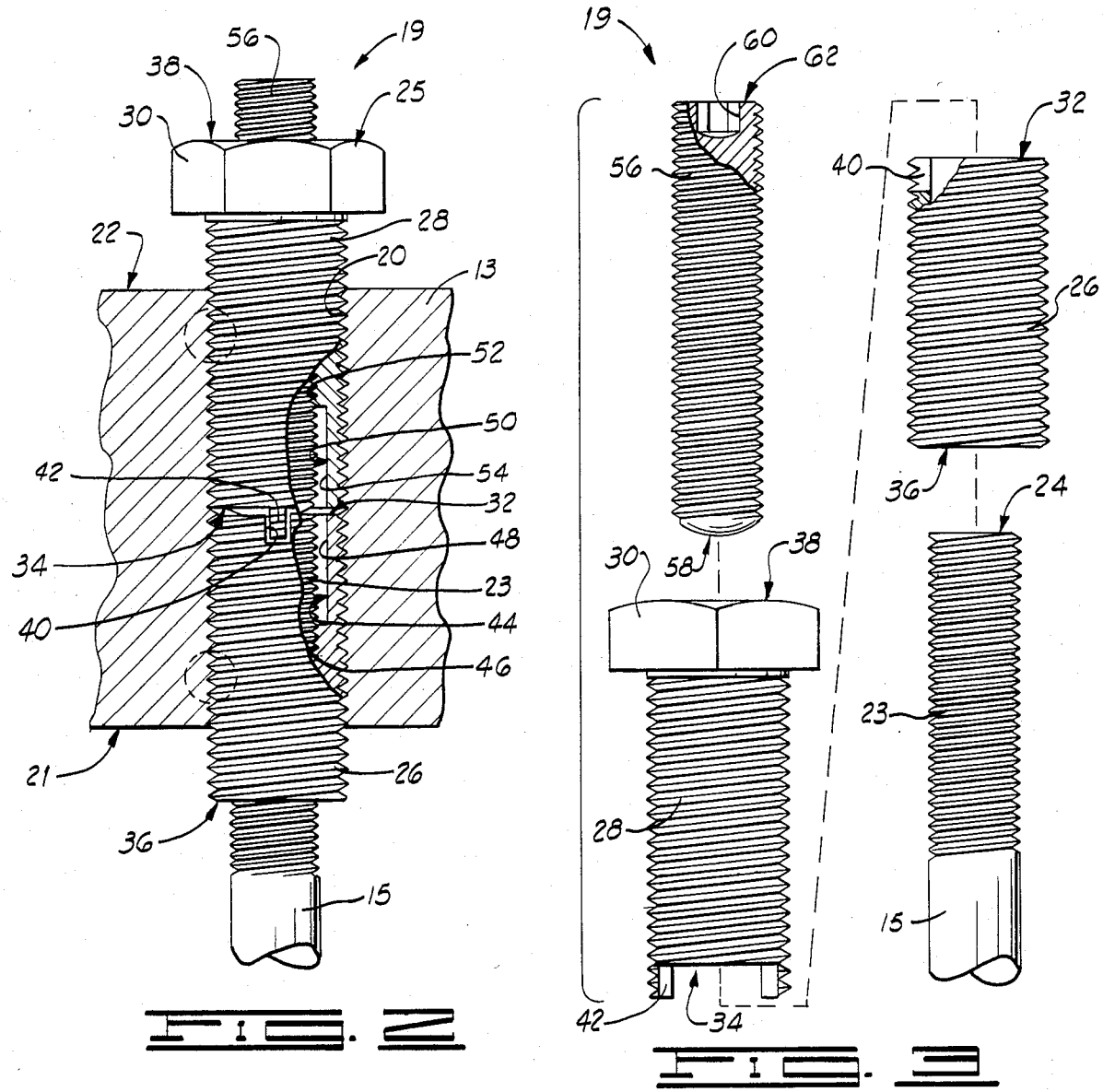
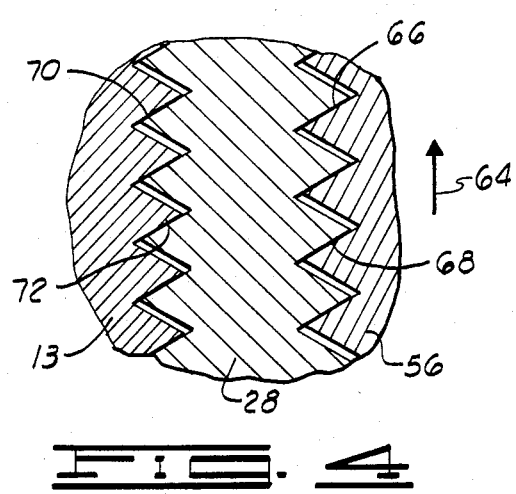

WEB MANUFACTURING APPARATUS

BACKGROUND OF THE INVENTION

1. Field of the Invention

The present invention relates generally to improvements in web manufacturing machinery and, more particularly, but not by way of limitation, to improvements in local web profile control using a flexible shaping member positioned to engage one side of the web and flexed by thermal expansion rods to profile such side of the web.

2. Brief Description of the Prior Art

In the manufacture of webs of plastic material, it is often necessary to provide dynamic control of the thickness of the web across its width. Where the web is formed from a fluid material, this control can be accomplished by providing the machine that manufactures the web with an elongated shaping member that engages the web material at a location in the machine at which the material is in a plastic state and flexing the shaping member along its length, which is transverse to the direction of movement of the web material, to profile one side of the material in a way that will cause the completed web to have a constant thickness throughout. For example, where the web is being produced by forcing molten plastic between the lips of an extrusion die, the shaping member is one of the lips of the die. By appropriately flexing such lip, the web thickness is maintained constant despite uneven flow of molten material to various portions of the die lips. Similarly, where the web is being produced by coating a previously formed web with a fluid component, a flexible doctor knife can be provided to adjust the thickness of the fluid component along the length of a coating roller by means of which the coating is applied to the substrate. In this case, the doctor knife is the flexible shaping member.

The flexing of the shaping member is effected by a series of force exerting devices that are arranged in a line down the length of the shaping member and the forces these devices exert on the shaping member can be controlled by a computer that receives signals from one or more web thickness sensors positioned to determine the thickness of a completed web. For example, where the web is manufactured by extrusion, a beta gauge might be positioned on the path the web follows after leaving the extrusion die and the gauge might be scanned back and forth across the width of the web to provide signals indicative of the web thickness across its width to the computer. The computer can then be programmed to actuate the force exerting devices in a manner that will keep the web thickness within preselected tolerances throughout the web width.

A particularly useful type of force exerting device for flexing the shaping member is a thermal expansion rod; that is, a rod which is equipped with a heating element so that portions of the rod can be caused to expand by varying amounts to adjust the force the rod exerts on objects engaged by the rod. One end of the rod is fixed and the other end bears against the shaping member so that the flexing of the shaping member can be controlled by the rate at which electrical energy is supplied to the heating elements on the expansion rods. Since the power supplied to each of the heating elements can be precisely controlled, the thermal expansion rods offer a capability for precise control of the shape of the shaping member and this control, in turn, offers a possibility for precise control of the thickness of the web across its width.

However, the full potential of web thickness control systems using a line of thermal expansion rods to position portions of a shaping member in contact with material of which a web is being formed has not been fully realized because of interacting practical problems that arise in the implementation of these systems. Initially, the effect of one thermal expansion rod on the shaping member cannot be treated independently of the effect of all of the other rods on the shaping member. Rather, the shaping member and the thermal expansion rods form an elastic system which must be considered as a whole in programming a computer to vary the currents through the heating elements on the thermal expansion rods to change the shape of the shaping member in a way that is dictated by the measured thickness of various portions of the web being produced. In particular, to cause the shaping member to have a particular configuration, the computer must be programmed to cause the heating of the totality of rods to result in some rods pushing on the shaping member while other rods pull on the shaping member. Moreover, any particular rod may, at times, be under compression and, at other times, be under tension to maintain the thickness of the web at a preselected value across the entire web. The programming itself presents no real problems because the thermal expansion coefficients of the rods and the elastic properties of the rods and shaping member are known so that it is possible to develop an accurate mathematical model of the system. The difficulty lies in the need for both pushing and pulling on the shaping member in conjunction with a second characteristic of the control system.

The second characteristic is a limitation in the range of web thickness variation that can be effected using thermal expansion rods. The lengths of the rods are subject to practical limitations so that, in general, it is not possible to make the rods long enough that any desired control range for the web thickness can be achieved solely by the heating of the rods. Rather, a control range must be selected and the fixed ends of the rods must be positioned so that heating of the rods can be used to maintain the web thickness within the selected control range. This need to be able to position the fixed ends of the thermal expansion rods conflicts with the need for a capability of the rods to be placed in tension as well as in compression.

Any mechanism that might be used to fix one end of a thermal expansion rod so that the other end of the rod can push or pull on a shaping member in a web manufacturing machine, as the occassion demands, must satisfy three practical requirements. It must be free of backlash; it must be inexpensive to manufacture; and it must be reasonably easy to adjust. The latter two requirements stem from the economics of web manufacture. In general, webs which are suited to manufacture using a flexible shaping member are manufactured in large widths and cut to size so that many thermal expansion rods may be needed to position its portions. The sheer number of the mechanisms required to fix one end of each end of these rods thus imposes the latter two conditions. As to the remaining condition, backlash would present an anomaly in the model used to develop a computer control program so that it would not be possible for the computer to predict the effect of adjusting the amount of power delivered to the heating elements on the thermal expansion rods. Rather, where backlash exists, it would be necessary to adopt a scheme of adjusting the power delivered to the heating elements, measuring the effect of the adjustment, and then making successive adjustments until the web thickness is within tolerances. Such a scheme is undesirable. By the time the adjustment of the power levels can be completed using such a scheme, the machine that manufactures the web may have produced a large quantity of nonstandard, and therefore commercially unacceptable, web.

The net result is that, while thermal expansion rod control of web manufacturing machines has been a useful technique, it has not been possible to realize the full potential of the technique. In general, prior art machines that make use of such control are designed to exert only unidirectional forces on the shaping member so that complete control of the shaping member has not been achieved in the past.

SUMMARY OF THE INVENTION

The present invention solves the problems of thermal expansion rod control of the configuration of the shaping member of a web manufacturing machine by providing a differential screw connection between the thermal expansion rods and the frame of the machine that is free of backlash, is inexpensive to manufacture, and is capable of rapid and precise adjustment to select a control range for the width of the web. Since the differential screw is free of backlash, the thermal expansion rods used in the machine can be bolted to the shaping member and fixed thereto with lock nuts so that the forces exerted by each of the thermal expansion rods on the shaping member can be in either of two directions extending axially along the thermal expansion rods. That is, the rods can either push or pull on the shaping member. Thus, complete control of the configuration of the shaping member is achieved at the same time that ease of positioning the fixed ends of the thermal expansion rods is effected.

To these ends, the differential screw of the present invention is comprised of an externally and internally threaded tubular member which is divided into two parts, a driven screw and an adjusting screw, that are disposed in tandem in a threaded bore formed in a support that can be a bar that is mounted on the machine frame to extend parallel to the shaping member. These screws are mechanically coupled so that the driven screw can be turned by turning the adjusting screw and one end of a thermal expansion rod is screwed into the bore of the driven screw to provide for axial positioning of the rod, via turning of the driven screw, in the manner of a conventional differential screw.

In addition to the tubular member, the adjusting screw contains a jam screw which can be turned in the adjusting screw to forcefully engage one end of the rod at the conclusion of any adjustment to the position of the rod. Such engagement causes an overall axial expansion of the differential screw, limited by the threads in the bore in which the differential screw is positioned, and this expansion establishes a fixed axial relationship between all portions of the differential screw once the jam screw is set. Thus, to advance or retract a rod a selected amount, it is necessary only to release the jam screw, turn the adjusting screw through an angle corresponding to the selected amount the rod is to be advanced, as determined by the difference in pitch between the internal and external threads of the driven screw, and reset the jam screw. Since the totality of elements of the differential screw assume the same relative axial positions when the jam screw is set, the rod will then have been advanced by just the amount selected.

The construction of the screw to include the overall expansion thereof when the jam screw is set thus effects both an elimination of backlash and an ease of adjustment of the thermal expansion rods. The expansion securely fixes the relative positions of the parts of the differential screw, the support, and the thermal expansion rod so that no backlash can exist in the system. Concurrently, the expansion of the differential screw results in a consistent relationship between angles through which the adjusting screw is turned and axial movement of the thermal expansion rod so that the adjustment of the shaping member is easily effected.

BRIEF DESCRIPTION OF THE DRAWINGS

FIG. 2 is an elevational view in partial cross section of a differential screw used in the web manufacturing apparatus.

FIG. 3 is an expanded elevational view in partial cross section of the differential screw shown in FIG. 2.

FIG. 4 is a cross section on enlarged scale of portions of the differential screw indicated by the upper dashed circle in FIG. 2.

FIG. 5 is a cross section on enlarged scale of portions of the differential screw indicated by the lower dashed circle in FIG. 2.

DESCRIPTION OF THE PREFERRED EMBODIMENT

Figure 1:
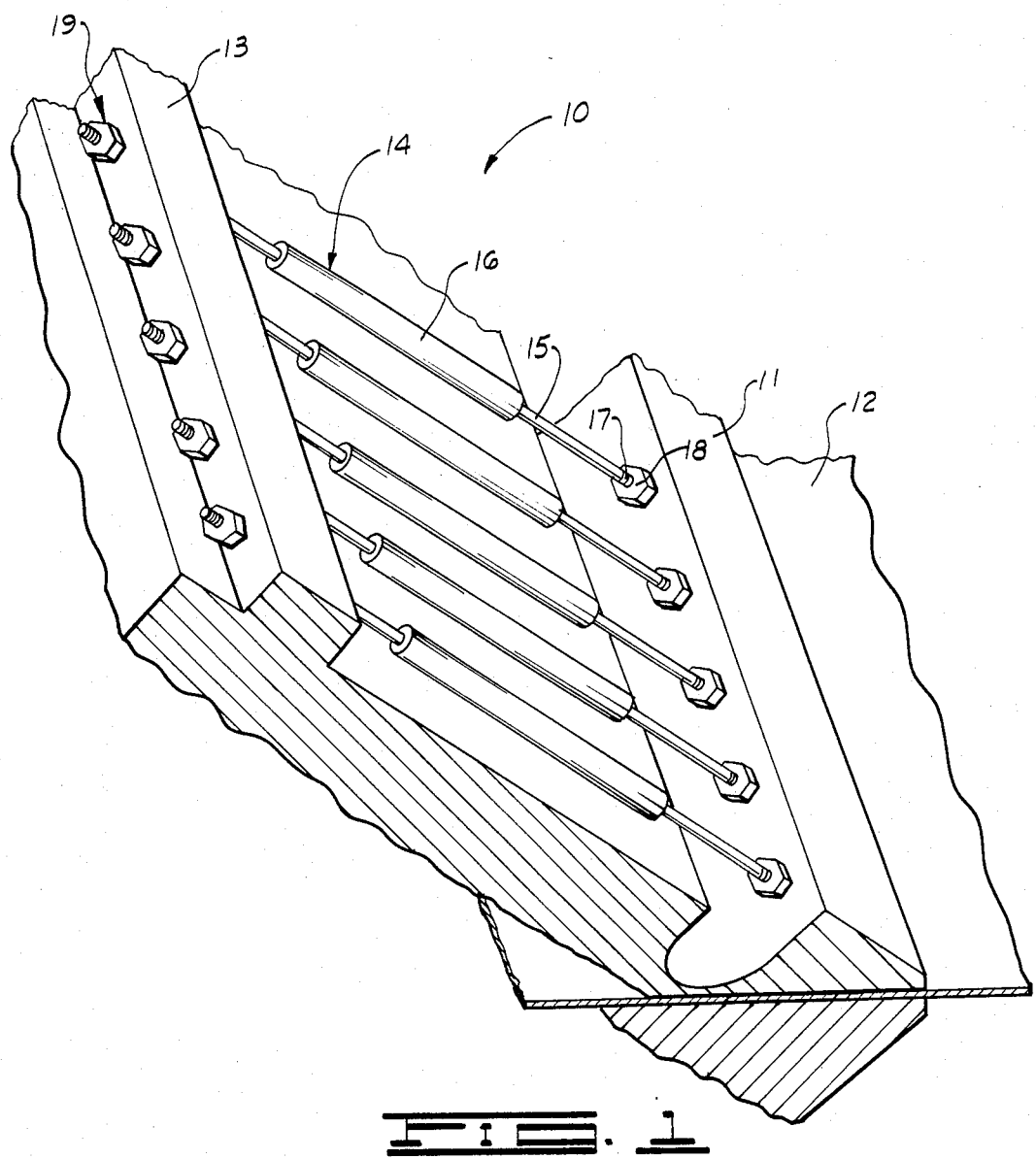
FIG. 1 is a perspective view in partial cutaway of one preferred embodiment of a web manufacturing apparatus constructed in accordance with the present invention.

Referring now to the drawings in general and to FIG. 1 in particular, shown therein and designated by the general reference numeral 10 is a portion of a web manufacturing machine constructed in accordance with the present invention. In general, the machine 10 comprises: an elongated shaping member 11 that engages and shapes material of which a web 12 is wholly or partially formed; a support 13 which extends parallel to the shaping member 11; and a plurality of thermal actuators 14 that are connected between the shaping member 11 and the support 13. The thermal actuators 14 are arranged in a row and each thermal actuator comprises a thermal expansion rod 15 that is equipped with a heating element 16 so that thermal expansion of the rods 15 can be used to flex the shaping member 11 in a manner that will cause the web 12 to have a constant thickness throughout its width. (Only one thermal actuator 14, and the rod 15 and heater 16 it includes, have been numerically designated in the drawings.)

For purposes of illustrating the control of the web thickness across the width of the web 12, the machine 10 has been drawn as a particular one of the various types of web manufacturing machines in which the improvement that is the subject matter of the invention might be used. In particular, the machine 10 has been drawn as an extrusion machine in which the shaping member is one of two die lips between which molten material is forced to form the web 12 as the material exits the machine 10 from between the lips. As is known in the art, the thickness profile of a web formed by such a machine depends upon several factors of which the spacing of the die lips along the length of the die is only one factor. That is, for a constant spacing between the die lips along their lengths, the thickness of the web will vary about a nominal thickness across its width. Web thickness control can be achieved in this type of machine by varying the power supplied to the heating elements 16 so that thermal expansion of the rods 15 will cause the rods 15 to exert a pattern of forces on the shaping member 11 that flexes the shaping member 11 to adjust the spacing between the die lips along their lengths. That is, non-constant spacing between the die lips is used to compensate for other factors that can cause the web to have a non-constant thickness across its width. The power supplied to each heating element 16 is controlled by a computer (not shown) which receives signals from a profile sensor (not shown) placed to measure the variation in web thickness, across the web width, as the web leaves the machine. Conventionally, the thickness profile sensor is a radiation sensor that is scanned back and forth across the width of the web as the web leaves the machine.

However, it is not contemplated that the invention be limited in its application to web extrusion machines. Rather, the invention can be used in any machine in which the thickness profile of a web can be controlled by means of a shaping member that engages material of which the web is formed and is flexed by a row of thermal expansion rods. As a second example of such a machine, which has not been illustrated herein, the machine 10 could also be a roll coating machine in which a coating roll is coated with a fluid material for transfer of the material to a substrate across which the coating roll is rolled. The nominal thickness of the web in such a machine is determined by the thickness of the material that is placed on the coating roll and this latter thickness is selected by the position of a flexible doctor knife that extends along the length of the coating roll to engage and shape the fluid material thereon. As in the case of an extrusion machine, factors other than the spacing between the doctor knife and the coating roll enter into the thickness profile of the coating on the substrate and control of the thickness profile of the coating can be achieved in the same manner that the web thickness is controlled in an extrusion machine. That is, the thickness profile of the coating on the substrate can be measured as the web leaves the coating machine and a computer receiving signals from the thickness profile sensor can be used to control the supply of power to heating elements wrapped on thermal expansion rods that flex the doctor knife. Thus, in a roll coater, the doctor knife would be the shaping member 11.

In the practice of the present invention, the thermal expansion rods 15 are fixed to the shaping member 11. For example, the shaping member 11 can be provided with a plurality of threaded bores (not shown) arranged in a row along the side thereof facing the support 13 so that threaded portions 17 of each of the thermal expansion rods 15 can be screwed into the shaping member 11. The thermal expansion rods 15 can then be fixed to the shaping member 11 by means of lock nuts 18 that are mounted on the threaded portions 17 of the thermal expansion rods 15 and are screwed down tightly against the shaping member 11 so that no relative motion between the thermal expansion rods 15 and the shaping member 11 can occur. By fixing the thermal expansion rods 15 to the shaping member 11, backlash is avoided in the connection of the thermal expansion rods 15 to the shaping member 11 so that, if backlash is also avoided in the connection of the thermal expansion rods 15 to the support 13, the power supplied to the heating elements 16 can be adjusted to cause any thermal expansion rod 15 to push or pull on the shaping member 11 as the occassion demands for control of the web thickness without introducing anomalous effects into such control. To this end, the connection of each thermal expansion rod 15 to the support 13 is effected by a zero backlash differential screw mechanism 19 that has been particularly shown in FIGS. 2 and 3.

Referring first to FIG. 2, the support 13 is provided with a plurality of bores 20, one of which is shown in FIG. 2, that extend through the support 13 to intersect a first side 21 of the support 13 that faces the shaping member 11 and a second side 22 of the support 13 that faces away from the shaping member 11. As indicated in FIG. 1, the bores 20 are positioned to align with the bores in the shaping member so that, as shown in FIG. 2, threaded portion 23 of each rod, near an upper end 24 thereof, can extend into a bore 20 of the support 13. The bores 20 of the support 13 are formed on a diameter larger than the diameters of the rods 15 so that a differential screw mechanism 19 can be disposed within each bore 20 to extend about the threaded portion 23 of a rod 15 and effect a connection between the rod 15 and the support 13. In addition, the bores 20 are internally threaded on a pitch that differs from the pitch of the threads on the portion 23 of the rods 15 so that a differential advancement and retraction capability can be incorporated into the connection between the rods 15 and the support 13 provided by the mechanisms 19. Such capability permits rapid and precise positioning of the rods 15 as will be discussed below.

Referring now to both FIGS. 2 and 3, the differential screw mechanism 19 is comprised of a tubular member, generally indicated by the numeral 25 that is divided into two portions disposed in a tandem relation in a bore 20. In particular, each tubular member 25 is comprised of a driven screw 26 having external threads to mate with the internal threads of a bore 20 and the driven screw 26 is screwed into the bore 20 to be disposed at least partly therein adjacent the first side 21 of the support 13 from which the rods 15 extend to the shaping member 11. Between the driven screw 26 and the second side 22 of the support 13, each tubular member 25 is comprised of an adjusting screw 28 that similarly has external threads to mate with the threads in the bores 20 of the support 13. A portion of each adjusting screw 28 protrudes from the bore 20 in which the adjusting screw 28 is mounted and a polygonal head 30 is formed on the protruding portion of each adjusting screw 28 so that the adjusting screw 28 can be turned via a socket wrench or the like that fits on the polygonal head 30.

It will thus be seen that each driven screw 26 has a first end 32 disposed interiorly of a bore 20 to face a first end 34 of an adjusting screw 28 disposed within the same bore 20 and each of these screws has an opposite second end, 36 for the driven screw 26 and 38 for the adjusting screw 28, with at least the second end 38 of the adjusting screw 28 protruding from the second side 22 of the support 13 opposite the side 21 thereof from which the rods 15 extend. A diametrically extending slot 40 is formed in the first end 32 of each driven screw 26 to receive two tangs 42 formed on the first end of each adjusting screw 28, adjacent the periphery thereof, so that the entire tubular member 28 can be turned by turning the head 30 of the adjusting screw 28. (Two tangs 42 are provided to strengthen the coupling between the driven screw 26 and the adjusting screw 28 but, in some cases, only one tang 42 may be used. Similarly, the slot and tangs can be interchanged between the driven and adjusting screws 26 and 28 respectively.) As can be seen in FIG. 2, the slot 40 and the tangs 42 are placed so that a slight separation will exist between the first ends 32, 34 of the screws 26, 28 to prevent jamming of one of the screws 26, 28 by the other of these screws.

The driven screws 26 each have a bore 44 formed axially therethrough to intersect the first and second ends, 32 and 36 respectively, thereof and the bore 44 has a threaded portion 46 adjacent the second end 36 of the driven screw 26 to receive the threaded portion 23 of a thermal expansion rod 15, the threads on the rod 15 mating with the threads in the portion 46 of the bore 44 for this purpose. Thus, since the pitch of the threads on the rods 15 differ slightly from the pitch of the threads in the bores 20, the driven screw 26 of each differential screw mechanism 19 and the rod 15 connected to such mechanism 19 will function as a conventional differential screw permitting axial adjustment of the rod 15 by turning the driven screw 26 in the bore 20 in which the screw 26 is disposed. As noted above, such turning can be accomplished by turning the adjusting screw 28 in the same bore 20 because of the coupling between the driven screw 26 and the adjusting screw 28 of each mechanism 19 that is provided by the slot 40 and the tangs 42 formed on the first ends, 32 and 34 respectively, of the driven and adjusting screws 26 and 28 respectively. Adjacent the first end 32 of each driven screw 26, the bore 44 formed therethrough has a smooth, enlarged diameter portion 48 whose purpose will become clear below.

Each adjusting screw 28 is similarly provided with an axial bore 50 that intersects the ends 34 and 38 of the adjusting screw 28 and extends therebetween. As in the case of the bore 44 formed through each driven screw 26, the bore 50 through each adjusting screw 28 is comprised of two portions: a threaded portion 52 adjacent the second end 38 of the adjusting screw 28 and an enlarged diameter, smooth-bore portion 54 adjacent the first end 34 of the adjusting screw 28. As can be seen in FIG. 2, the smoothbore portion 52 of the bore 50 has a diameter substantially equal to the smoothbore portion 48 of the bore 44 and the threaded portions, 54 and 46, of the bores 50 and 44 respectively similarly have substantially equal diameters. Thus, since the smooth bore portions of the bores 44 and 50 are adjacent facing ends of the screws 26 and 28, an object screwed into either of the bores 44, 50 can be extended a considerable distance into the other of the bores 44, 50 without engaging threads in such other of the bores 44, 50. This characteristic of the bores 44, 50 enables the differential screw to provide the rod 18 with a wide range of axial adjustment as will be discussed more fully below.

Each differential screw mechanism 19 further comprises a jam screw 56 which is externally threaded to mate with the internally threaded portion 52 of the bores 50 of the adjusting screws 28 and, as shown in FIG. 2, the jam screw 56 is screwed into the bore 50 so that one end 58 of the jam screw 56 faces the end 24 of the rod 15 that is supported by the differential screw mechanism 19. A polygonal socket 60 is formed in the other end 62 of the jam screw 56 so that the jam screw 56 can be advanced in either direction in the bore 50 of the adjusting screw 28 by means of a suitable wrench inserted in the socket 60 to permit turning of the jam screw 56 with respect to the adjusting screw 28.

OPERATION OF THE PREFERRED EMBODIMENT

As has been noted above, the overall operation of the machine 10, once the shaping member 11 has been positioned for automatic control of the web thickness profile, is carried out using a computer. In particular, the machine 10 is provided with an apparatus to monitor the thickness of the web across the width of the web and signals produced by the monitor are transmitted to a computer which adjusts the power supplied to the heating elements 16 to maintain a selected web thickness profile.

In order to cause the machine 10 to carryout such mode of operation, it is necessary that the shaping member 11 be initially positioned to select a nominal thickness for the web 12. In general, thermal expansion of the rods 15 of the actuators 14 is capable of controlling the web thickness only within narrow limits. Thus, the shaping member 11 must be positioned so that these limits need not be exceeded to achieve the desired web thickness. One aspect of the invention relates to the facility with which the positioning of the shaping member 11 is achieved.

However, there also exists a second, and perhaps more important, aspect of the invention. As has been noted, the thermal expansion rods 15, the support 13, and the shaping member 11 form an elastic system which must be considered as a whole in programming a computer to control the thickness profile of a web. When a mathematical analysis of this elastic system is carried out to develop control algorithms, it is found that complete control of the shape of the shaping member 11, and thus complete control of the web thickness profile, can be obtained only if the thermal expansion rods 15 can be placed in tension as well as in compression. Moreover, an adjustment to the web thickness profile may require that certain of the thermal expansion rods 15 undergo a transition from compression to tension or vice versa. The second aspect of the invention is that the differential screw mechanisms 19 enable the thermal expansion rods 15 to be fixed to the shaping member 11, so that the thermal expansion rods 15 can push or pull on the shaping member 11 to provide complete control of the web thickness profile, without introducing backlash into the connections between the thermal expansion rods 15 and the support 13 that would give rise to anomolies in a computer control algorithm.

It will be useful to consider the facility with which the shaping member 11 can be positioned first. In general, the application to which the machine 10 is put and the temperature range through which the thermal expansion rods 15 are to be heated determine a nominal position for the shaping member 11 that will be known at the time the machine 10 is set up to manufacture a run of web. During such manufacture, the control of the web thickness profile is effected by positioning portions of the shaping member 11 with respect to the nominal position so that such positioning counteracts factors which would otherwise cause the web to have an uneven thickness across its width. The nominal position can be selected to correspond to temperatures of the thermal expansion rods 15 at the centers of a control range and will be related to the position of the shaping member 11 when the thermal expansion rods are at room temperature. Thus, before the run is commenced, the position of the shaping member 11 necessary to control the web thickness profile, for no heating of the thermal expansion rods 15, will be known. Similarly, the actual position of the shaping member 11 will either be known or can be measured. Thus, preparing the machine 10 for a production run is a matter of moving each of the thermal expansion rods 15 axially by known amounts.

The differential screw characteristics of the mechanism 19 greatly facilitates the axial positioning of the thermal expansion rods 15. To position each rod 15, the jam screw 56 in the differential screw mechanism 19 into which the rod 15 extends is turned, while holding the adjusting screw 28 of the mechanism 19 in place, to free the mechanism 19 for subsequent positioning of the thermal expansion rod 15. With the jam screw 56 released, the adjusting screw 28 can be turned through a selected angle and, because of the above described connection between the adjusting screw 28 and the driven screw 26, the driven screw 26 will turn through substantially the same angle. The angle through which the adjusting screw 28 is turned is selected so that the difference in pitch between internal and external threads of the driven screw will provide the desired axial shift in the position of the thermal expansion rod. (A slight difference will exist between the angles through which the two screws 26 and 28 turn because of a slight difference between the widths of the slots 40 in the first ends 32 of the driven screws 26 and the tangs 42 on the first end 34 of the adjusting screws 28. However, this difference will not introduce an anomaly into the control of the flexing of the shaping member 11 as would backlash in the screw connections between the rods 15, the driven screws 26 and the support 13. Rather, the difference in the angles through which the driven and adjusting screws, 26 and 28 respectively, are turned merely introduces a small discrepancy between the actual initial position of each thermal expansion rod and the desired initial position of the rod. This discrepancy is very small because of the smallness of the slot and tang width difference in relation to the circumferences of the driven and adjusting screws so that the effect of the difference can easily be absorbed in the computerized control of the shaping member configuration.) After the axial position adjustment has been made to a thermal expansion rod, the jam screw 56 of the differential screw mechanism 19 into which the rod 15 extends is turned so that the end 58 of the jam screw 56 engages the end 24 of the thermal expansion rod 15 to lock the thermal expansion rod 15 and the differential screw mechanism 19 into position on the support 13.

Before proceding to the zero backlash aspect of the invention, it will be useful to note two specific features of the differential screw mechanisms 19 that are related to the setting of the initial position of the shaping member 11. As has been previously noted, the bores 44 and 50 through the driven and adjusting screws 26 and 28 respectively have enlarged smooth bore portions 48 and 54 at the abutting first ends 32 and 34 of the screws 26 and 28 respectively. These smooth bore portions of the bores 48 and 50 provide the machine 10 with a capability for manufacturing webs with a wide range of thicknesses. As will be clear from the above description of the setting of the initial position of the shaping member 11, a thermal expansion rod 15 can be moved axially without interfering with the turning of the driven and adjusting screw 26 and 28 so long as the threaded portion 23 of the rod 15 does not enter the threaded portion 52 of the bore 50 through the adjusting screw 28 and the jam screw 56 does not enter the threaded portion 46 of the bore 44 through the driven screw 26. Thus, by including the smooth bore portions 48 and 54 of the bores 44 and 50, and making such portions an appreciable portion of the lengths of the driven and adjusting screws, 26 and 28 respectively, the differential screw mechanisms 19 are provided with a capability for effecting large changes in the axial positions of the thermal expansion rods 15 thereby permitting the machine 10 to be utilized to manufacture webs having a wide range of thicknesses.

A second feature of the differential screw mechanism 19 that should be noted is the manner in which provision is made to grip the adjusting screw 28 and the jam screw 56 for turning either of these screws. That is, the adjusting screw 28 is provided with a polygonal head 30 at the end thereof that protrudes from the second side 22 of the support 13 and a polygonal socket 60 is formed in the end of the jam screw 56 adjacent the head 30. In some cases, the support 13 will be buried within a web manufacturing machine to limit access to the differential screw mechanisms 19. With the described construction of the adjusting and jam screws, 28 and 56 respectively, adjustment of the differential screw mechanisms 19 to position a thermal expansion rod 15 is easily carried out with a tool formed by mounting a polygonal socket on the end of a tube. The tool can be inserted into the machine so that the socket of the tool is placed over the polygonal head 30 and a length of polygonal rod can be inserted through the tube and into the polygonal socket 60 of the jam screw 56. The tube can then be turned to turn the adjusting screw and the polygonal rod can be turned to release or set the jam screw.

The zero backlash aspect of the invention stems from the two-part construction of the tubular member 25 to comprise the driven and adjusting screws 26 and 28, from the mounting of the threaded portion 23 of the thermal expansion rod 15 in the driven screw 26, and from the mounting of the jam screw 56 in the adjusting screw 28. In particular, when the jam screw 56 is turned to tightly engage the end 24 of the thermal expansion rod 15 as shown in FIG. 2, an overall axial expansion of the differential screw mechanism 19 in the bore 20 through the support 13 occurs to lock portions of the thermal expansion rod 15 adjacent the end 24 thereof against any movement relative to the support 13 as will now be explained with particular reference to FIGS. 3 and 4 which illustrate cross sections through the differential screw substantially at the upper and lower dashed circles respectively in FIG. 2. Referring first to FIG. 4, the effect of engaging the end 58 of the jam screw 56 with the end 24 of the rod 15 would be to force the threads on the jam screw 56 in the direction indicated by the arrow 64 in FIG. 4. Thus, the helical surface of the threads of the jam screw 56 that has been indicated as 66 in FIG. 4 will engage the helical surface of the internal threads of the adjusting screw 28 that has been indicated as 68 in FIG. 4 to drive the adjusting screw 28 toward the side 22 of the support 13; that is, in the direction 64 in FIG. 4. Such movement of the adjusting screw 28 will bring the helical surface 70 on the external threads of the adjusting screw 28 into engagement with the helical surface 72 of the threads in the bore 20 of the support 13. These two engagements, along with the engagement between the end 58 of the jam screw 56 and the end 24 of the thermal expansion rod 15, securely blocks the thermal expansion rod 15 from undergoing any movement in the direction 64 toward the side 22 of the support 13.

Similarly, the engagement of the end 24 of the thermal expansion rod 15 by the end 58 of the jam screw 56 will drive the thermal expansion rod 15 in the direction 74 in FIG. 5; that is, toward the side 21 of the support 13 so that the helical surface 76 on the threads of the rod 15 will engage the helical surface 78 on the internal threads of the driven screw 26. Such engagement will cause the driven screw 26 to move in the direction 74 so that the helical surface 80 of the external threads of the driven screw 26 will tightly engage the helical surface 82 of the threads formed in the bore 20 of the support 13. Thus, the engagement of the surface 76 with the surface 78 and the engagement of the surface 80 with the surface 82 securely locks the thermal expansion rod 15 against any movement in the direction 74 toward the first side 21 of the support 13. Accordingly, once the jam screw is set, portions of the thermal expansion rod 15 near the end 24 thereof are securely positioned with respect to the support 13 so that no backlash exists in the connection between the thermal expansion rods 15 and the support 13.

It should also be noted that the axial expansion of the differential screw mechanism 19 when the jam screw 56 is set eliminates any effect that play in the threads of the driven screw 26 and the thermal expansion rod 15 might otherwise have on the setting of the initial position of the shaping member 11. Once the jam screw 56 is screwed down tightly against the end 24 of the thermal expansion rod 15, the engagement of the helical thread surface 76 on the thermal expansion rod 15 with the helical thread surface 78 in the bore 44 of the driven screw 26 and the engagement of the helical thread surface 80 on the driven screw 26 with the helical thread surface 82 in the bore 20 of the support 13 establishes a fixed axial relationship between the thermal expansion rod 15 and the support 13 that depends only upon the orientation of the driven screw 26 in the bore 20 through the support 13. Thus, when an adjustment to the axial position of the thermal expansion rod 15 is made by turning the adjusting screw 28 as has been described above, the angle through which the adjusting screw 28 is turned bears a fixed relationship to the axial displacement of the thermal expansion rod 15 resulting from the turning of the adjusting screw 28.

It is clear that the present invention is well adapted to carryout the objects and attain the ends and advantages mentioned as well as those inherent therein. While a presently preferred embodiment of the invention has been described for purposes of this disclosure, numerous changes will be made which will readily suggest themselves to those skilled in the art and which are encompassed within the spirit of the invention disclosed and as defined in the appended claims.

What is claimed is:

1. In a web manufacturing machine including an elongated shaping member engaging material from which the web is formed to adjust the thickness of said material along the length of the shaping member, a support extending parallel to the shaping member, and a plurality of thermal expansion rods mounted on the support and extending to the shaping member to position portions of the shaping member via flexing of the shaping member, the improvement wherein one end of each expansion rod is fixed to the shaping member; wherein a plurality of threaded bores having diameters larger than the diameters of the expansion rods are formed through the support to receive the other ends of the expansion rods, whereby each expansion rod extends from one side of the support; and wherein each expansion rod is connected to the support via a mechanism for axially positioning each rod without backlash, comprising:

a driven screw and an adjusting screw disposed in tandem in the support bore and each of the driven and adjusting screws having external threads to mate with the threads of the support bore, the driven screw positioned adjacent the side of the support from which said rod extends and having an axial bore therethrough threaded on a pitch differing from the pitch of the external threads thereon, and the adjusting screw having a threaded, axial bore formed therethrough; and a jam screw screwed into the adjusting screw bore; wherein means are formed on facing ends of the driven and adjusting screws for rotatively coupling the driven screw to the adjusting screw; and wherein a portion of said rod near the end thereof adjacent the support is threaded to mate with the threads in the driven screw bore, said portion of said rod being screwed into the driven screw bore.

2. The machine of claim 1 wherein a portion of each adjusting screw protrudes from the support bore, said portion having a polygonal head formed thereon; and wherein a polygonal socket is formed in the end of each jam screw adjacent said polygonal head.

3. The machine of claim 1 wherein the means for rotatively coupling the driven screw to the adjusting screw comprises a slot formed in the end of the driven screw facing the adjusting screw and at least one tang formed on the end of the adjusting screw facing the driven screw, said tang extending into said slot.

4. The machine of claim 3 wherein a portion of each adjusting screw protrudes from the support bore, said portion having a polygonal head formed thereon; and wherein a polygonal socket is formed in the end of each jam screw adjacent said polygonal head.

5. The machine of claim 1 wherein the bores of each of the driven and adjusting screws have enlarged diameter portions adjacent facing ends of said screws.

6. The machine of claim 5 wherein the means for rotatively coupling the driven screw to the adjusting screw comprises a slot formed in the end of the driven screw facing the adjusting screw and at least one tang formed on the end of the adjusting screw facing the driven screw, said tang extending into said slot.

7. The machine of claim 6 wherein a portion of each adjusting screw protrudes from the support bore, said portion having a polygonal head formed thereon; and wherein a polygonal socket is formed in the end of each jam screw adjacent said polygonal head.

8. A mechanism for axially positioning a non-rotating rod extending from one side of a support, said support having a threaded bore formed therethrough to receive said mechanism, comprising:

a driven screw and an adjusting screw disposed in tandem in the support bore and each of the driven and adjusting screws having external threads to mate with the threads of the support bore, the driven screw positioned adjacent the side of the support from which said rod extends and having an axial bore therethrough threaded on a pitch differing from the pitch of the external threads thereon, and the adjusting screw having a threaded, axial bore formed therethrough; and a jam screw screwed into the adjusting screw bore; wherein means are formed on facing ends of the driven and adjusting screws for rotatively coupling the driven screw to the adjusting screw; and wherein a portion of said rod near the end thereof adjacent the support is threaded to mate with the threads in the driven screw bore, said portion of said rod being screwed into the driven screw bore.

9. The mechanism of claim 8 wherein a portion of the adjusting screw protrudes from the support bore, said portion having a polygonal head formed thereon; and wherein a polygonal socket is formed in the end of the jam screw adjacent said polygonal head.

10. The mechanism of claim 8 wherein the means for rotatively coupling the driven screw to the adjusting screw comprises a slot formed in the end of the driven screw facing the adjusting screw and at least one tang formed on the end of the adjusting screw facing the driven screw, said tang extending into said slot.

11. The mechanism of claim 10 wherein a portion of the adjusting screw protrudes from the support bore, said portion having a polygonal head formed thereon; and wherein a polygonal socket is formed in the end of the jam screw adjacent said polygonal head.

12. The mechanism of claim 8 wherein the bores of each of the driven and adjusting screws have enlarged diameter portions adjacent facing ends of said screws.

13. The mechanism of claim 12 wherein the means for rotatively coupling the driven screw to the adjusting screw comprises a slot formed in the end of the driven screw facing the adjusting screw and at least one tang formed on the end of the adjusting screw facing the driven screw, said tang extending into said slot.

14. The mechanism of claim 13 wherein a portion of the adjusting screw protrudes from the support bore, said portion having a polygonal head formed thereon; and wherein a polygonal socket is formed in the end of the jam screw adjacent said polygonal head.

15. In a differential screw of the type including a tubular member having external threads for screwing the tubular member into a support and internal threads cut on a different pitch than said external threads for screwingly receiving the threaded end of a rod to be axially positioned by turning said tubular member, the improvement wherein the tubular member is divided into tandemly positioned driven and adjusting screws coupled for rotation of the driven screw in response to rotation of the adjusting screw; wherein said rod is screwed into the driven screw; and wherein the differential screw further comprises a jam screw screwed into the adjusting screw.

16. The differential screw of claim 15 wherein the driven and adjusting screws have enlarged diameter portions adjacent facing ends thereof.

17. The differential screw of claim 15 wherein a slot is formed in one end of one of the driven and adjusting screws and at least one tang is formed on one end of the other of the driven and adjusting screws, said ends of the driven and adjusting screws whereon the slot and tang are formed being facing ends whereby said tang can be received in said slot to couple the driven screw to the adjusting screw for rotation of the driven screw in response to rotation of the adjusting screw.

18. The differential screw of claim 15 wherein a portion of the adjusting screw protrudes from the support bore, said portion having a polygonal head formed thereon; and wherein a polygonal socket is formed in the end of the jam screw adjacent said polygonal head.

* * * * *